United States Patent [19]

Ravagnan

[11] 4,221,669
[45] Sep. 9, 1980

[54] SYSTEM FOR SEPARATING AND REMOVING OIL BASED MATTER FROM LIQUIDS SUCH AS WATER

[76] Inventor: Giancarlo Ravagnan, Via Euganea, 33, Padova, Italy

[21] Appl. No.: 862,453

[22] Filed: Dec. 20, 1977

[30] Foreign Application Priority Data

Dec. 28, 1976 [IT] Italy ............................... 41710 A/76

[51] Int. Cl.² ............................................. E02B 15/04
[52] U.S. Cl. ............................ 210/104; 210/DIG. 25; 210/242 S; 210/416 R
[58] Field of Search .................... 210/242 S, DIG. 25, 210/DIG. 26, 122, 104, 109, 110, 113, 114

[56] References Cited

U.S. PATENT DOCUMENTS

| 3,279,604 | 10/1966 | Leviel | 210/110 |
| 3,358,838 | 12/1967 | Kosar et al. | 210/DIG. 26 |
| 3,659,713 | 5/1972 | Mueller | 210/DIG. 25 |
| 3,670,890 | 6/1972 | Hall, Jr. | 210/104 |
| 3,847,815 | 11/1974 | Bgnis | 210/DIG. 25 |
| 3,905,902 | 9/1975 | Hoegberg et al. | 210/DIG. 25 |
| 3,916,674 | 11/1975 | Miller et al. | 210/DIG. 25 |
| 3,957,638 | 5/1976 | Veld | 210/109 |
| 4,021,344 | 5/1977 | Webb | 210/DIG. 25 |
| 4,051,024 | 9/1977 | Lowe et al. | 210/DIG. 26 |

Primary Examiner—Theodore A. Granger
Attorney, Agent, or Firm—Guido Modiano; Albert Josif

[57] ABSTRACT

System for separating and removing oil based matter from liquids such as water, which comprises a plurality of vertical rotating discs, partly immersed in the liquid containing oil based matter. Means are provided to separate from the discs those materials which adhere thereto and to convey such materials to a first container. Further means are provided, which are adapted to discharge periodically such materials from the first container. Means are also provided for preferentially conveying the materials present on the liquid surface toward the discs.

1 Claim, 11 Drawing Figures

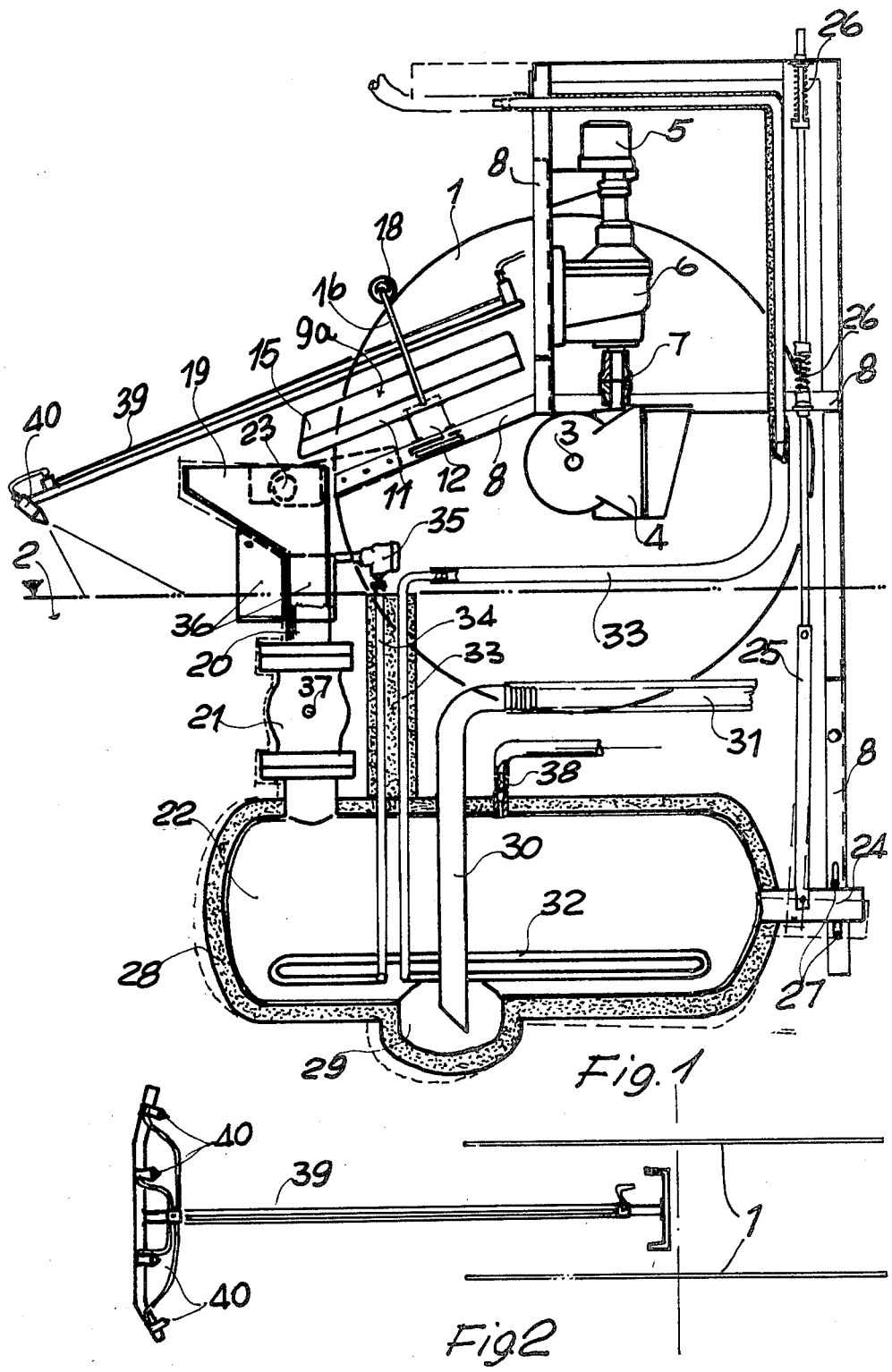

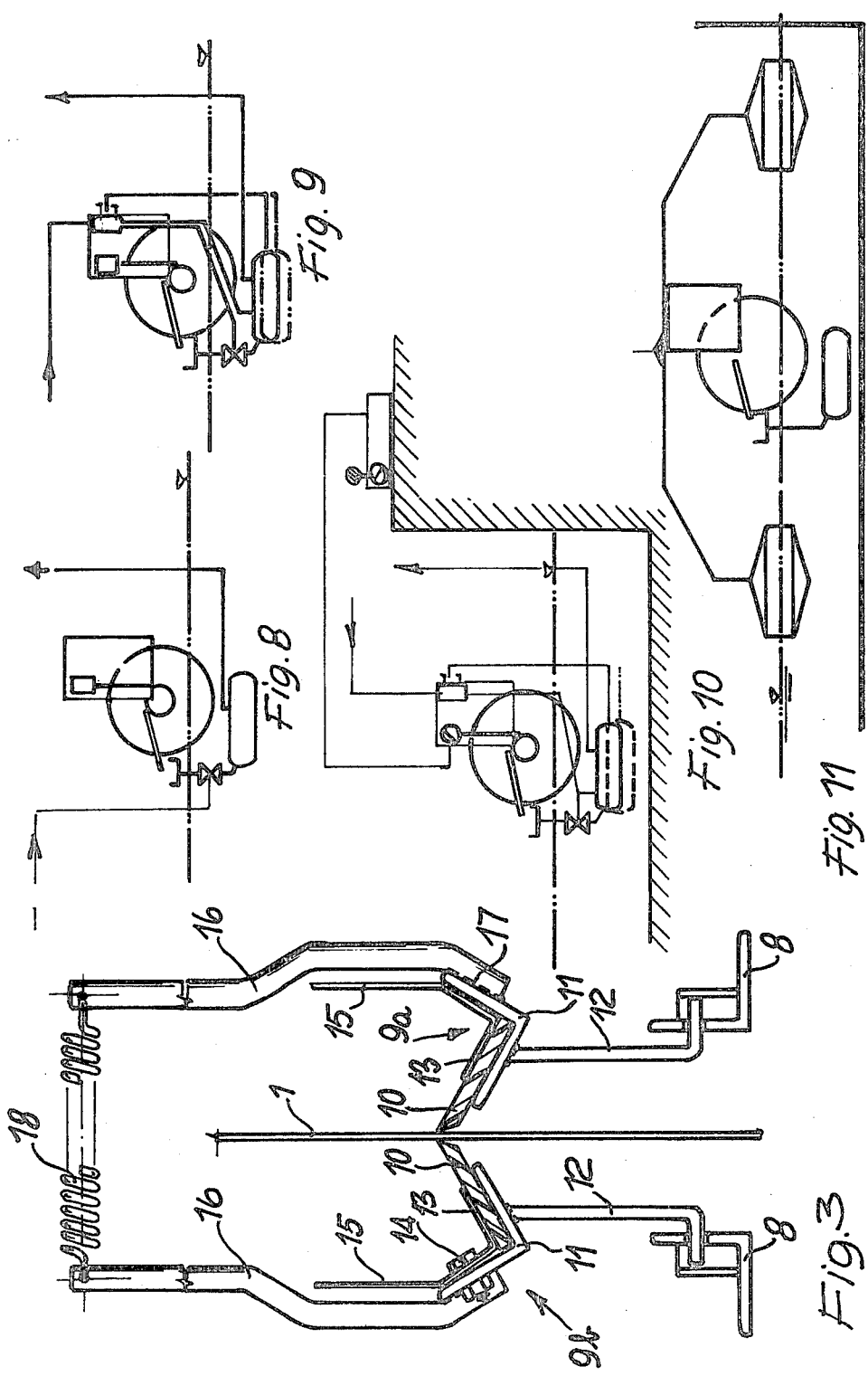

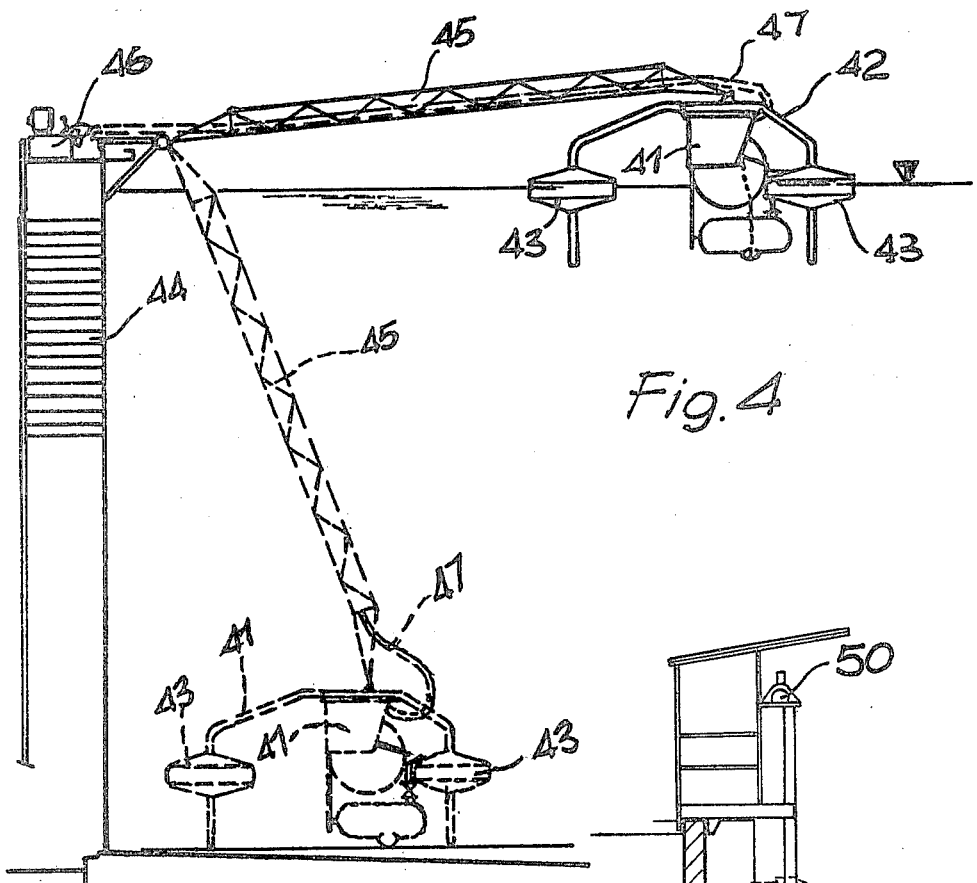
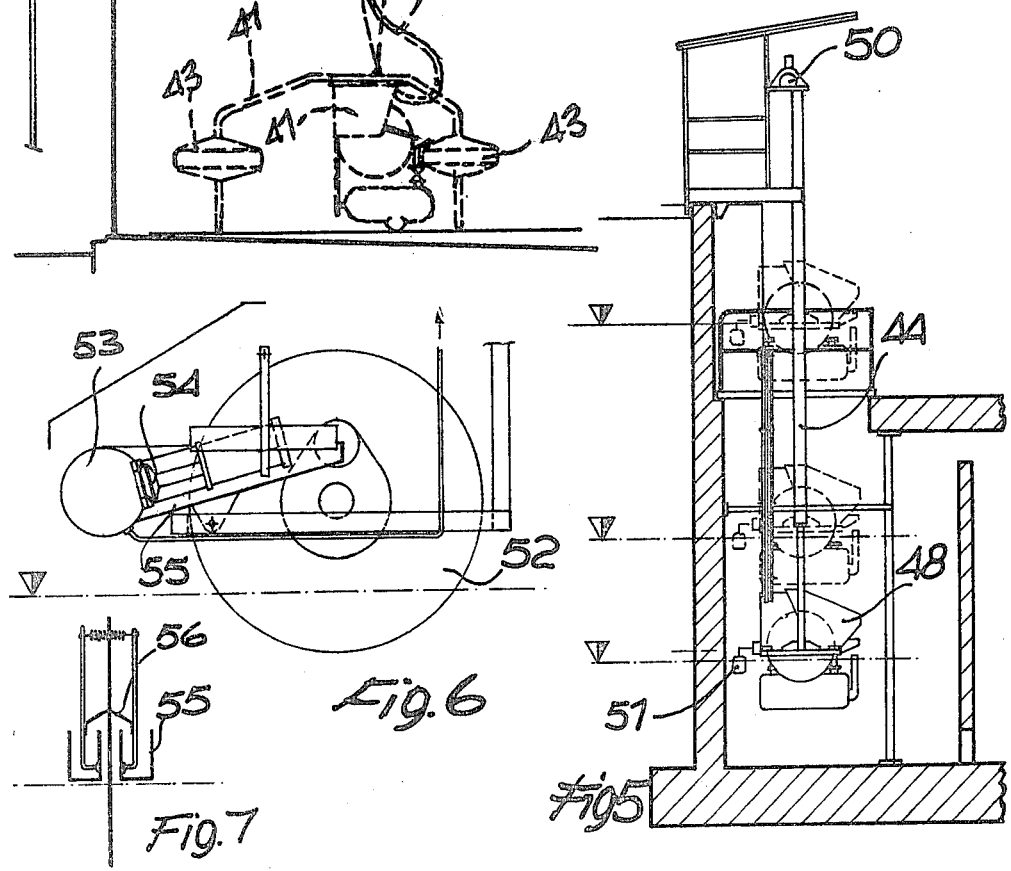

SYSTEM FOR SEPARATING AND REMOVING OIL BASED MATTER FROM LIQUIDS SUCH AS WATER

BACKGROUND OF THE INVENTION

This invention relates to an improved system for separating and removing oil based matter from liquids such as water, the system being particularly useful in the continuous treatment of acqueous liquids including thick oil residue, as are to be found in the drain tanks for the waste of industrial plants.

Prior art techniques and systems for separating and removing oil based matter floating on industrial processing waste waters are both numerous and varied.

The principle underlying such techniques is essentially one of draining such waste to collecting tanks, thereafter either the waste liquids are allowed to sediment and separate according to their specific gravities—the lighter materials being then removed by overflow—or a surface is brought to contact the tank free surface, whereto said materials are caused to adhere for subsequent removal and collection into suitable containers.

This improved system is related to machines operating on the principle of movable adhesion surfaces.

SUMMARY OF THE INVENTION

It is a primary object of this invention to improve on the features of such a system such as to make the system as efficient as possible.

It is another object of the invention to provide for the application of the inventive system also to tanks where an explosion hazard exists.

A further object of the invention is to provide an automatic discharge device for the primary collecting container, operative only when the latter has been actually filled with oil containing liquids.

Still another important object is that of creating in the tank a preferential stream across the free surface thereof, such that the floating materials are conveyed onto the withdrawal means for complete withdrawal thereof.

These objects are achieved by an improved system for separating and removing oil based matter from liquids such as water, characterized in that it comprises a plurality of vertical rotating discs, partly immersed in the liquid containing oil based matter, means operative to separate from said discs those materials which adhere thereto and to convey such materials to a first container, means adapted to discharge, periodically and/or upon weighing, said materials from said first container, and means for preferentially conveying the materials present on the liquid surface toward said discs.

BRIEF DESCRIPTION OF THE DRAWINGS

Further features and advantages will be apparent from the following description of the inventive system and some embodiments thereof, illustrated by way of example and not of limitation in the accompanying drawings, where:

FIG. 1 is a side view of a system according to the invention;

FIG. 2 shows a detail of the floating materials conveying devices;

FIG. 3 shows a detail of scraping members;

FIG. 4 is a side view of a linked floating system;

FIG. 5 is a partly sectional side view of a system as installed in a well;

FIG. 6 is a side view of a system wherein only a portion of the discs is immersed;

FIG. 7 shows a detail of the system of FIG. 6; and

FIGS. 8, 9, 10 and 11 show as many installation variations.

DESCRIPTION OF THE PREFERRED EMBODIMENTS

With reference to the cited figures, the system comprises an apparatus including two discs 1, partly immersed in the liquid 2 to be purified, the discs being mounted for rotation about a horizontal shaft 3. Said shaft is driven rotatively by a worm and gear coupling 4, in turn driven by a hydraulic motor 5 through an interposed reduction gear 6 and flexible coupling 7. The discs are preferably of stainless steel, but any other smooth surfaced material could also be used.

This whole assembly—as well as other parts to be described hereinafter—is supported by a latticework frame 8, only partially shown.

Each disc 1, at its above-water portion, cooperates with a pair of scraping members 9a and 9b (FIG. 3) acting on the side faces of the discs and substantially including each a blade 10 of an elastic material which is inclined contrary to the rotation direction of the disc 1 and clamped between two angle bars, the bottom one whereof, indicated at 11, also act as a support, it being secured as by welding to a bracket 12 which is engaged at its bottom portion with said frame 8 for swinging movement towards and away from the disc 1. The second angle bar, indicated at 13, follows the same pattern of the first and is associated therewith by screws and nuts 14, with interposition of said elastic blade 10, and has an upturned wing 15 serving as a ducting channel for the materials removed from the disc 1.

From said angle bars 11, there project upwardly two arms 16 which are associated therewith as by welding 17, and connected at their tops by a cylindrical coil spring 18 suitable to apply scraping forces to the blades 10.

The entire assembly described hereinabove, and in particular the scraping blades 10, are also inclined to the horizontal (FIG. 1) such as to favor the falling of the materials detached from the disc toward a collecting area.

Said collecting area consists of a funnel-like collector 19 located below the discharge areas of said ducting channels 15, which through a descent duct 20 and pneumatically operated valve 21, allows the oil containing matter to fall into a first surge tank 22.

Valve 21 is preferably a crimping sleeve valve, comprising internally a rubber sleeve capable of being crimped or chocked under the action of fluid pressure on the outside walls thereof.

The assembly including the tank 22, valve 21, duct 20 and collector 19 forms a unit which is supported by a hinge 23 connecting it to said frame 8, such that it is enabled to move depending on the weight of the material contained therein.

Said surge tank 22 is provided, at its side most remote and opposite to the vertical through said hinge 23, with a projecting axial cylindrical lug 24, whereto is connected an articulated rod 25 associated with the frame through springs 26 acting against the weight of the container, the rod 25 actuating a pneumatic discharge devices to be described hereinafter.

Said cylindrical lug 24 is allowed to move freely between two travel limiters 27 provided by a vertical slot in the structure of the frame 8, thereby being guided and limited in its movement with respect to the hinge 23.

It will be appreciated that the articulated rod 25 and the cylindrical lug 24 constitute a linkage supporting the end of the container 22 where the cylindrical lug is arranged.

Said surge tank 22 has an insulating coating 28 lining it internally, and further includes a lower collecting pan or well 29 in which a drain or discharge conduit 30 opens, which through a pipe 31 takes the collected material to a second collecting container, not shown.

In order to improve the fluidity of the materials collected in the surge tank, a pair of hollow rings are provided, one of these being indicated at 32, wherethrough pressurized steam is circulated from a conduit 33. The rings terminate into a second conduit 34 which, through an exhauster 35, passes steam into a jacket 36 surrounding said conduit 20 to heat it.

To promote discharge through the pipe 31, compressed air or nitrogen is admitted to the pneumatically operated valve 21 through an inlet 37, thereby the valve closes; that same compressed gas enters the top of the surge tank 22 through a valve 38.

It will be appreciated that the inlet 37, the valve 21 and the valve 38 constitute pressure fluid means for controlling the ejection of oil based material collected in the surgetank 22. It will be further appreciated that the articulated rod 25 constitutes also a control means for periodically activating the pressure fluid means, as above described.

To convey the floating materials onto the discs 1, provision is made to include a fixed rack 39 having a plurality of nozzles 40 blowing air or nitrogen in the direction of the discs.

In case of low outdoor temperatures instead of air or nitrogen, steam can be used for the purpose to avoid hardening of the oil matter.

FIG. 4 illustrates a type of installation of the system wherein the latter is located in a collecting tank of the waters to be purified. The machinery indicated at 41 is suspended from a support 42 with three legs and floats 43. The assembly is then anchored to the edge of the tank 44 by means of a latticework arm having hinges at its ends. In this particular embodiment, the system is of the explosion proof type, and an outer control unit 46 is provided which is connected to the machine through piping 47.

FIG. 5 shows another type of installation, where a machine, presently indicated at 48, is slidable vertically along guides 49 and held suspended by a winch 50. A level sensor 51 monitors the liquid level variation and, through pneumatic means, controls the raising and lowering of the machine such that the discs are always held correctly immersed.

In the case of tanks or vessels of shallow depth (FIG. 6) only a portion of the disc 52 is immersed, while all the other parts, i.e. the surge tank 53 and valve 54, remain above the level of the liquid. In this instance, the collectors 55 of the scrapers 56 are of a much wider design, in order to afford a better collecting action.

In FIGS. 8,9,10 and 11, some variations of the system are illustrated: in particular, FIG. 8 shows a system having a pressurized and timed discharge and an electric drive motor; FIG. 9 shows a system having an electric drive motor and a weighing type of pressurized discharge; FIG. 10 shows an explosion proof system with hydraulic motor and weight controlled discharge; FIG. 11 shows a system of the floating type.

Obviously, in addition to the variations described herein, many other approaches are possible all of which fall within the scope of this invention.

The system described hereinbefore operates as follows.

The discs rotate partly immersed and oil based matter surfacing from the acqueous waste to be purified adheres thereon. By blowing air or nitrogen, the nozzles favor concentration of such matter in the area where the discs are operative. The latter, by entering the water without causing any stirring therein, completely remove the oil matter, without producing emulsions which could disperse part of it. Then, the scraping blades wipe the disc such that as the latter re-enter the water it carries along no oily materials which could be re-dispersed through the water.

Once the surge tank has been loaded with a predetermined amount of the withdrawn or extracted material, i.e. upon reaching a certain weight on the calibrated suspending springs—which, in practice, is equivalent to carrying out a weighing step—the rod 25 actuates a limit switch device (not shown) which controls, through a pneumatic circuit (not shown), the closing of the valve 21 and the admission of gas under pressure to the surge tank, thereby the collected material is emptied out. It will be obvious that this automatic control must be integrated by either a manually operated or timed discharge control, such as to prevent the formation of stagnant deposits when the extracted material is scarce, which would involve long intervals between the discharge and weighing steps.

It should be noted that a system to this design affords removal of any greasy substances—as having a coefficient of adhesion higher than water—without any risk of dispersing portions thereof by re-immersing movable members which are foul or not sufficiently de-greased.

The systems according to this invention will be constructed of suitable materials, depending upon the areas of application. The dimensions will also vary according to individual requirements.

In an embodiment carried out into practice, the sleeve valve 21 used was constructed by the French Company DOSAPRO, under license of PIC.

The known pneumatic circuit for operating the indicated component part of the system and the controlling members and respective limit switches thereof may be those manufactured by the Italian Company Waircom S.p.A. of Milan, Italy.

I claim:

1. A system for separating and removing oil based matter from liquids such as water, comprising in combination, a container, adjacent thereto a plurality of vertical rotating discs partly immersed in the liquid containing oil based matter, scraping blade means operative to separate from said discs those oil based materials which adhere thereto and to convey such materials to said container, swingable spring biased support means for said scraping blade means to urge yeldably said scraping blade means against said discs, controlled pressure fluid means for pressurizing said container to discharge said materials from said container, valve means for said pressure fluid means, control means for periodically activating said pressure fluid means and wherein according to the improvement said control means include an arrangement responsive to the weight of said first container comprising hinge means for supporting said container pivotally about an horizontal axis of said hinge means, said hinge means being arranged offset from the center of gravity of said container, a linkage supporting an end of said container remote from said hinge means to hold in balance said container, said linkage having spring means allowing limited angular movements of said containers and an actuating rod for actuating said pressure fluid means when the unbalance of said container exceeds a preestablished value and wherein said container is an insulated and heated surge tank into which the separated oil based material is flown, said surge tank having pneumatically controlled normally open valve means allowing the flow by gravity of oil based material thereinto and responsive to the fluid pressure of said pressure fluid means to close said valve when pressure fluid is admitted to said surge tank to eject oil based material collected in said surge tank, means for preferentially conveying the materials present on the liquid surface toward said discs.

* * * * *